April 25, 1933.   E. B. WILFORD   1,905,776
AIRCRAFT
Filed Feb. 20, 1931   2 Sheets-Sheet 1
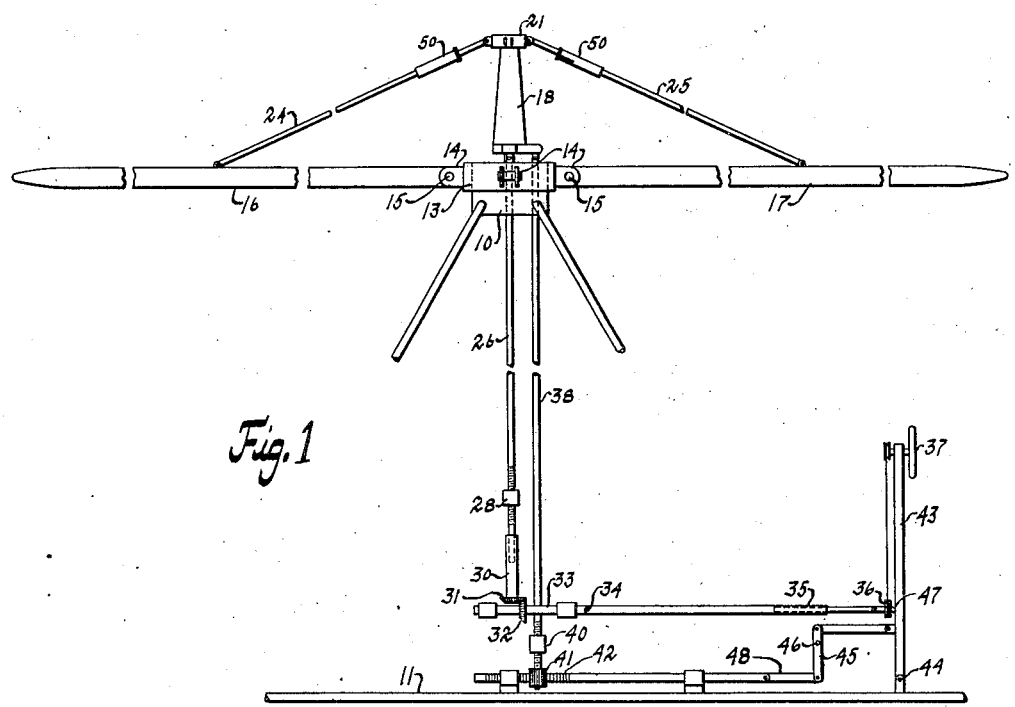
Fig. 1
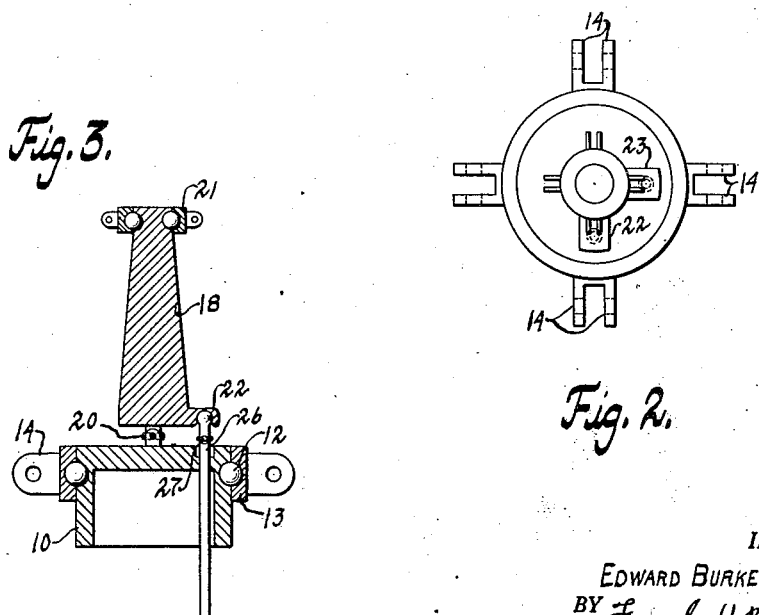
Fig. 3.
Fig. 2.
INVENTOR.
EDWARD BURKE WILFORD.
BY Frank H. Borden
ATTORNEY.

April 25, 1933. E. B. WILFORD 1,905,776
AIRCRAFT
Filed Feb. 20, 1931 2 Sheets-Sheet 2
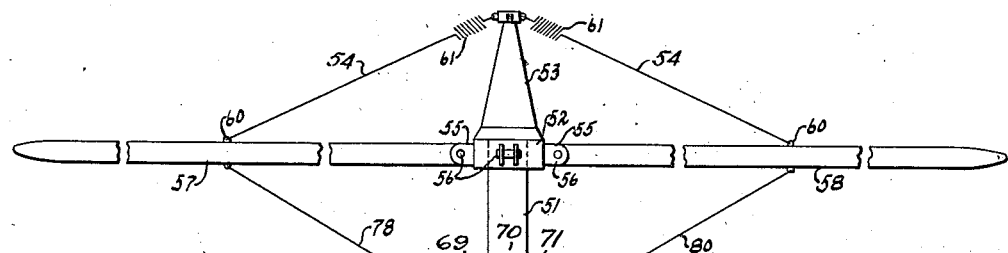
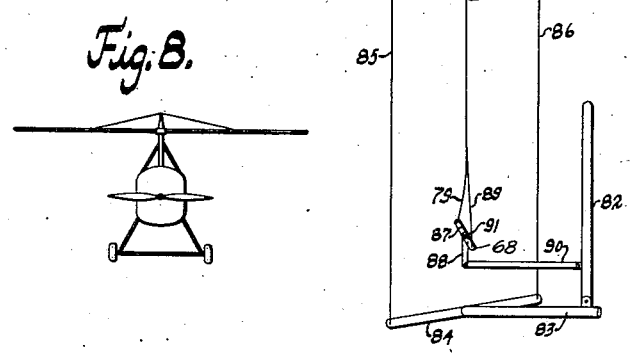
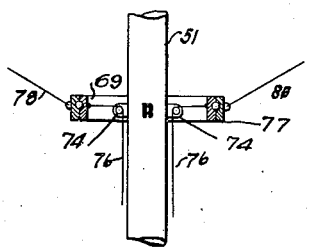
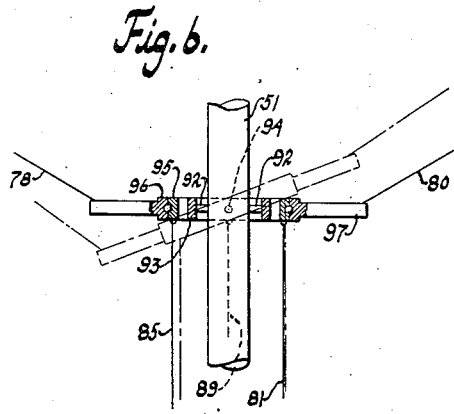
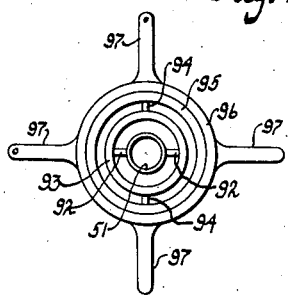
INVENTOR.
EDWARD BURKE WILFORD.
BY Frank H. Borden
ATTORNEY.

Patented Apr. 25, 1933

1,905,776

UNITED STATES PATENT OFFICE

EDWARD BURKE WILFORD, OF MERION, PENNSYLVANIA

AIRCRAFT

Application filed February 20, 1931. Serial No. 517,226.

This invention relates to aircraft having rotating wing systems either of the gyroplane or helicopter types.

It is the main object of the invention to secure stabilizing or controlling functions in aircraft from the rotating wing system itself. This contemplates the provision of pilot controlled means to secure rolling or pitching moments from the blades of the rotating wing system of the aircraft. The invention contemplates the elimination of the conventional controlling surfaces such as ailerons, stub wings, and the like.

A further object of the invention is to provide an aircraft in which means is provided to modify or alter the normal lift equalizing movements of the wings of the rotating wing system to secure predetermined pitching or rolling moments or combinations of the two or an absence of such rolling or pitching moments as may be desired.

In the accompanying drawings:

Fig. 1 represents a fragmentary side elevation of a rotating wing system of an aircraft with means for controlling the effective lift of a blade by the provision of thrust members effective on top of the blade, Fig. 2 represents a fragmentary plan of the hub of the rotating wing system shown in Fig. 1, Fig. 3 represents a vertical section on an enlarged scale through the controlling mechanism of the device of Fig. 1, Fig. 4 represents a side elevation partially in perspective of a modified form of rotating wing system with means operable to control the effective lift of blades of the system by restraining devices effective below the wing, Fig. 5 represents a fragmentary section partially in elevation of a modified form of controlling means for the device in Fig. 4, Fig. 6 represents a fragmentary section partially in elevation of a still further modified form of the controlling means of the device shown in Fig. 4, Fig. 7 represents a plan of the modification shown in Fig. 6, and Fig. 8 represents a diagrammatic front elevation of an aircraft incorporating the invention herein.

Referring to Fig. 1 a stationary mast 10 suitably and immovably positioned relative to a frame bar 11 of the aircraft provides a stationary raceway for the ball bearings 12 supporting the rotatable hub. Hub 13 has substantially radially disposed ears 14 forming bearings for hinge pins 15 by which a plurality such as four blades, respectively, of which but two, 16 and 17, are shown, are pivotally mounted to the hub. Any other form of hinge may be used such as a compound hinge enabling movement of the blade in two perpendicular planes. A mast extension 18 is connected by a universal joint 20 to the top of mast 10, forms a bearing for a rotatable collar 21 and is provided just above the universal joint 20 with ears 22 and 23 radially extending from the extension 18 and disposed perpendicularly to each other. A series of compression or thrust devices as 24 and 25 are provided which are pivoted at one end of the rotatable collar 21 and at the other ends pivoted to the respective blades 16 and 17 substantially in line with the center of pressure of said blades. There will be as many thrust members as there are blades.

As the controlling functions are to be derived from an eccentric positioning of the mast extension 18 relative to the mast 10 controlling means of any desired sort may be provided. For instance, a rod 26 having a ball and socket connection with lug 22 through a universal joint 27, may extend through the mast end 10 and be disposed for vertical movements through rotating through a threaded shank working in a stationary nut 28. The end of the rod 26 may have a telescoping connection with a tube 30 terminating in bevel gear 31 in mesh with a cooperating bevel gear 32 mounted on a shaft 33 having universal joint 34 and lost motion connection 35 with a pulley 36 rotating by the wheel control 37. A similar rod 38 has a ball and socket connection with lug 23 and is also guided in the upper end of the mast 10 and is moved vertically by having a threaded portion engaged in a threaded nut 40 and driven by a pinion gear 41 in mesh with a rack 42 movable in response to longitudinal movement of the stick 43 pivoted at 44 to a frame member and working lever 45 about a pivot 46 through the links 47 and 48.

It will be observed that the rotating wing system may be caused to rotate in any desired manner whether by the application of power or through aerodynamic reaction, and the compression members 24 and 25 and the collar 21 will rotate with the blades as a unit. Each compression member may have a lost motion connection 50 which may be a combined lost motion connection and shock absorber whereby each blade may have a certain predetermined upward movement to equalize the lift on opposite sides of the mast 10 as is well known in the art, without any adverse result from the controlling mechanism disclosed. The shock absorbers 50 may be of conventional type and need not be disclosed in detail. In order to secure a predetermined unequal lift on one side or the other of the mast, it will be assumed that the mast extension 18 for instance, will be caused to move on its pivot toward the left. The effect of this movement is to tend to push blade 16 downwardly and to raise blade 17. When the blades are in motion about the vertical axis of the mast each blade as it comes into the position occupied by blade 16 in Fig. 1 will be limited in its upward movement or may actually be depressed to a degree precluding vertical movement so that the lift of the blade is a maximum, whereas blade 17 will be moved upwardly, and in the event of rotation each blade as it reaches the position of blade 17 in Fig. 1 will be moved upwardly to decrease the lift of said blade.

It will be apparent that rotation of end wheel 37 through the connections shown will cause rotation of the threaded rod 26 causing movement of the mast extension 18 in a plane perpendicular to the drawing of Fig. 1. As such movement is in a plane transverse of the longitudinal axis of the aircraft (parallel to the plane of the drawing of Fig. 1) lateral or rolling moments will be developed in accordance with the degree through which mast extension 18 is moved. Similarly fore and aft movement of the wheel 37, moving handle or stick 43 will move the rack 42 relative to the pinion 41 and cause movement of the mast extension 18 relative to the mast 10 in a plane longitudinal of the aircraft.

Referring to the disclosure of Fig. 4, there is provided a rotating wing system including flexibly mounted blades, with variable restraining devices operable as tension members on the lower side of each blade or wing. Obviously the disclosure of that figure is purely illustrative and is subject to material modification. A stationary mast 51 is provided with suitable bearings so as to form a mount for a rotatable hub 52, which may terminate at the top in a conical portion 53 to which the conventional droop wires 54 may be attached, to carry the load of the wings, to be described, when the wing system is stationary. The hub has a series of hinge points 55, which may be compound hinges having movement in two more or less perpendicular planes, but which include certainly a substantially horizontal pintle 56. It will be understood that as many hinge points are provided as there are blades or wings, as for instance, and preferably, four of each. In Fig. 4 there are but two blades illustrated, respectively 57 and 58. It will be understood that the blades swing upwardly as the lift on each increases to a point sufficient to overcome the tendency of centrifugal force to maintain the blade in a substantially horizontal position. The droop wires are attached to each blade preferably at some point near the center of lift, as at 60, and each may have a shock absorber or tensioning device as 61 included in its structure.

In one form of the actuating controlling mechanism, as shown in Fig. 4, a series of pivot points are diametrically disposed about the axis of the mast or the rotating wing system, fixed by the trussing frame work 62 of the assembly. To each point there is connected a bell crank lever, respectively 64, 65 and 66, normally disposed with one leg extending horizontally radially of the vertical axis and with the other leg extending vertically in parallelism with the axis. The upper legs of the bell crank levers are each provided with a longitudinal slot, as shown at 67. The levers are coupled in diametrically opposite pairs through the operating mechanism, and arranged for each lever of a pair to swing simultaneously so that the vertical legs of each pair swing laterally (diametrically of the vertical axis) in the same direction.

An inner thrust bearing member 69 is provided, normally concentric with the mast 51, having a series of inwardly directed spaced lugs arranged in pairs, as at 70, 71. Each pair of lugs supports a rod as 72, extending parallel to a tangent of the periphery of the bearing member. Each rod passes through the slot 67 of an appropriate bell crank lever arm as disclosed.

The mounting of the thrust bearing member 69 may be achieved in a simplified manner by the modification shown in Fig. 5. In this latter case the mast 51 has a series of pulleys or rollers 74 extending radially of the mast. Thrust member 69 has inwardly directed anchorages 75 in radial alignment with the pulleys, and cables 76 connected with the anchorages pass over the pulleys, and cables 76 connected with the anchorages pass over the pulleys and down to control mechanism below.

In either form of support, and in any of the many other modifications that will occur to those skilled in the art, it will be apparent that the thrust member can be moved to any desired position of eccentricity relative to the vertical axis of the rotating wing assembly, and similarly can be actuated again to a position of concentricity as desired.

Rotatably mounted on the thrust member 69 is the rotatable secondary thrust element 77. Extending from the periphery of the latter member are a series of strain devices, respectively 78 and 80 normally in one diametric plane, in the case of a two bladed rotating wing system, with additional strain devices for each additional blade in the system as will be clear. In this connection it will be obvious that the disposition and number of the blades relative to the axis will determine the disposition and number of the strain devices.

Each strain device includes shock absorbing elements 81, if desired, and the strain device is preferably attached to the lower side of its appropriate wing in alignment with the center of lift, or substantially so.

Any desired sort of control mechanism may be used, obviously, for changing the axis of rotation of the rotatable thrust element 77. For general purposes it is preferred that some mechanism be provided which is non-reversible, or substantially so, so that impulses from the rotating wing system will not be carried back to the pilot's controlling mechanism; such as a worm drive, for instance. The actuating mechanism may, therefore be of the sort disclosed in Fig. 1. If a stick control is to be used such as is illustrated in Fig. 4, the stick 82 may be mounted on an oscillatable shaft 83, carrying oppositely extending arms 84 respectively engaged by cables or rods 85 and 86 connected to the legs of bell crank levers 64 and 66, or connected to the ends of cables 76 in the modified form of actuating connection. A bell crank 91 is provided pivoted on an axis transverse of the shaft 83, having a short arm 88 connected by the link 90 to the stick 82, and having arms 87 and 68 connected to the respective connections 79 and 89 extending to the other bell crank levers, or to the other control cables 76 shown in Fig. 5, as will be clear.

It will be observed that with the structure disclosed in Figs. 4 and 5 that the outer thrust member 77 is caused to move in a substantially horizontal plane so that its axis of rotation is eccentric to the axis of the mast 51. The substantially horizontal disposition of the outer thrust member 77, however, may be subject to changes in elevation according to the strain imposed by the lifting forces acting on the blades. For this reason the form of invention disclosed in Fig. 6 is preferred.

Referring to Fig. 6 the mast 51 has lugs 92 supporting a floating ring 93, which in turn by lugs 94, radially spaced at 90° from the lugs 92 supports an outer floating ring 95. The gimbal suspension thus provided permits the ring 95 to have universal pivoting about axis perpendicular to the mast 51. Floating ring 95 forms a raceway for ball bearings supporting the outer rotatable tilting ring 96 provided with as many radially extending arms 97 as there are blades in the rotating wing system. The rotating tilting ring 96 normally lies in a substantially horizontal plane and the strain connections 78, 80, etc., extend from the ends of the arm 97 to the appropriate wings or blades of the system. The position of tilting wing 95 may be determined by cables connected thereto at four peripherally spaced diametrically opposite cables running to the controlling mechanism. In this form of the invention the rotating ring 96 is not moved laterally of the axis of mast 51 but is caused to tilt so as to lie in any desired plane angularly divergent from the horizontal.

With the structure disclosed in either Fig. 4, 5, 6, or 7 it will be observed that movement of the ring 77 in a horizontal plane or tilting movement of the ring 96 in the case of Figs. 6 and 7 places tension on the restraining devices on one side of the mast 51 while slackening the tension on the restraining devices on the other side of the mast 51. This differential tension causes the normal tilting moment of a blade on its horizontal axis 56 to be restrained in one position of the blade and to be freely permitted in another position of the blade and thereby to secure a desired predetermined rolling or pitching moment.

Obviously the residual rolling moment (due to the inertia of the blades) of the rotating wing system can be obviated by disposing the restraining members under an initial differential tension such as to compensate for the residual rolling moment.

It is contemplated that the rotating wing system may be power driven, or may simply be rotated by aerodynamic reaction.

It will be obvious that many modifications and improvements may be made in the invention set out herein and such are to be construed as within the scope of the invention unless otherwise limited in the appended claims.

I claim:

1. In gyroplanes, means defining an axis of rotation of a wing system, wings pivoted to said means, means adjustably positioned relative to the first mentioned means to a position of eccentricity relative to said means, compression members engaging said wings and said positionable means to limit the pivotal movement of said wings.

2. In gyroplanes, a mast, a mast extension pivoted relative to the mast a hub rotatably mounted on the mast, blades pivoted to the hub, a ring rotatably disposed on the mast extension, compression members engaging between the ring and the respective blades, and means for varying the angular relation of the mast extension to the mast.

Signed at Philadelphia, county of Philadelphia, and State of Pennsylvania, this 16th day of February, 1931.

EDWARD BURKE WILFORD.